United States Patent
van der Weide et al.

(10) Patent No.: US 10,739,211 B2
(45) Date of Patent: Aug. 11, 2020

(54) CHIPLESS RFID-BASED TEMPERATURE THRESHOLD SENSOR

(71) Applicant: vdW Design, LLC, Madison, WI (US)

(72) Inventors: Daniel W. van der Weide, Madison, WI (US); Marcos Martinez, Madison, WI (US)

(73) Assignee: vdW Design, LLC, Madison, WI (US)

( * ) Notice: Subject to any disclaimer, the term of this patent is extended or adjusted under 35 U.S.C. 154(b) by 0 days.

(21) Appl. No.: 15/843,894

(22) Filed: Dec. 15, 2017

(65) Prior Publication Data

US 2018/0180491 A1 Jun. 28, 2018

Related U.S. Application Data

(60) Provisional application No. 62/435,460, filed on Dec. 16, 2016.

(51) Int. Cl.
| | |
|---|---|
| *G01K 7/34* | (2006.01) |
| *G06K 7/10* | (2006.01) |
| *G01K 1/02* | (2006.01) |
| *G01K 3/04* | (2006.01) |
| *G01K 7/32* | (2006.01) |

(52) U.S. Cl.
CPC ............ *G01K 7/343* (2013.01); *G01K 1/024* (2013.01); *G01K 3/04* (2013.01); *G01K 7/32* (2013.01); *G06K 7/10366* (2013.01)

(58) Field of Classification Search
CPC ............ G06K 7/10; G06K 19/07; G01K 7/34; H04Q 5/22; G08B 13/00; G08B 13/14
USPC ................................. 340/10.1–10.5
See application file for complete search history.

(56) References Cited

U.S. PATENT DOCUMENTS

| | | | | |
|---|---|---|---|---|
| 6,294,997 | B1* | 9/2001 | Paratore | G06K 19/0717 235/385 |
| 6,617,963 | B1* | 9/2003 | Watters | G01D 5/48 340/10.41 |
| 7,490,575 | B2* | 2/2009 | Taylor | G01K 3/005 116/207 |
| 7,495,558 | B2* | 2/2009 | Pope | G01K 1/024 340/572.1 |
| 7,911,345 | B2* | 3/2011 | Potyrailo | G06K 7/0095 340/10.1 |
| 8,348,504 | B2* | 1/2013 | Gregory | F01D 17/085 374/117 |
| 8,409,875 | B2* | 4/2013 | Johal | G01N 33/54373 435/283.1 |
| 8,499,367 | B2* | 8/2013 | Almqvist | A61F 7/02 2/458 |
| 8,542,023 | B2* | 9/2013 | Potyrailo | G01N 27/02 324/652 |

(Continued)

OTHER PUBLICATIONS

Amin, E.M., et al. Development of a chipless RFID temperature sensor using cascaded spiral resonators. IEEE Sensors Proceedings, 2011; 554-557.

(Continued)

*Primary Examiner* — Nam V Nguyen
(74) *Attorney, Agent, or Firm* — Casimir Jones SC; David W. Staple

(57) ABSTRACT

Provided herein are chipless radio-frequency identification (RFID)-based sensors that exhibit an altered electromagnetic signature when sensor-specific temperature threshold is crossed.

11 Claims, 7 Drawing Sheets

(56) References Cited

U.S. PATENT DOCUMENTS

| | | | | |
|---|---|---|---|---|
| 8,542,024 | B2* | 9/2013 | Potyrailo | G01N 27/02 |
| | | | | 324/652 |
| 8,671,871 | B2* | 3/2014 | Huffman | G01K 3/04 |
| | | | | 116/207 |
| 8,870,082 | B2* | 10/2014 | Cattaneo | G01K 3/04 |
| | | | | 235/453 |
| 8,917,202 | B2* | 12/2014 | Grosinger | G01S 7/412 |
| | | | | 340/425.1 |
| 9,030,295 | B2* | 5/2015 | Allen | G06Q 10/08 |
| | | | | 340/10.1 |
| 9,494,541 | B2* | 11/2016 | Potyrailo | G01N 33/0031 |
| 9,589,686 | B2* | 3/2017 | Potyrailo | G21C 17/022 |
| 9,678,030 | B2* | 6/2017 | Potyrailo | G01N 27/228 |
| 9,690,962 | B2* | 6/2017 | van der Weide | G06K 19/0672 |
| 9,740,891 | B1* | 8/2017 | Robshaw | G06K 7/10009 |
| 10,402,604 | B2 | 9/2019 | Van Der Weide et al. | |
| 2006/0006987 | A1* | 1/2006 | Hashimoto | G06K 7/0008 |
| | | | | 340/10.51 |
| 2008/0252425 | A1* | 10/2008 | Okegawa | G06K 19/07749 |
| | | | | 340/10.1 |
| 2009/0188396 | A1* | 7/2009 | Hofmann | G01K 1/024 |
| | | | | 99/342 |
| 2010/0079288 | A1* | 4/2010 | Collins | G06K 19/0717 |
| | | | | 340/572.4 |
| 2010/0290503 | A1* | 11/2010 | Rumpf, Jr. | G01K 7/32 |
| | | | | 374/163 |
| 2011/0084888 | A1* | 4/2011 | Nishioka | H01Q 5/35 |
| | | | | 343/728 |
| 2013/0119135 | A1* | 5/2013 | Gauthier | H01Q 1/2216 |
| | | | | 235/439 |
| 2014/0354414 | A1* | 12/2014 | Karmakar | G06K 7/10306 |
| | | | | 340/10.3 |
| 2015/0310327 | A1* | 10/2015 | Karmakar | H01Q 1/2225 |
| | | | | 340/10.1 |
| 2015/0377544 | A1* | 12/2015 | Nelson | F25D 23/065 |
| | | | | 340/10.1 |
| 2016/0166470 | A1* | 6/2016 | Tobescu | A61J 1/18 |
| | | | | 340/691.6 |
| 2016/0267769 | A1* | 9/2016 | Rokhsaz | G06K 19/0717 |

OTHER PUBLICATIONS

Amin, E.M., et al. Smart Sensing Materials for Low-Cost Chipless RFID Sensor. IEEE Sensors Journal, 2014; 14(7), 2198-2207.

Bahl, I.J., et al. Simple and Accurate Formulas for a Microstrip with Finite Strip Thickness. Proceedings of the IEEE, 1977; 65(11), 1611-1612.

Mahmood, A. et al., An evanescent-mode cavity resonator based thermal sensor. Proceedings of IEEE Sensors, 2007; 950-953.

Mandel, C. et al., Wireless temperature sensing with bst-based chipless transponder utilizing a passive phase modulation scheme. In Frequenz, 2011; 65, 225-231.

Martinez, M. et al., Circular polarization of depolarizing chipless RFID tags. IEEE Radio and Wireless Symposium, RWS, Mar. 2016, 145-147.

Masoudi, R. et al., Extension of Valderrama-Patel-Teja equation of state to modelling single and mixed electrolyte solutions. Chemical Engineering Science, 2003; 58(9), 1743-1749.

Matsuoka, T. et al., Effect of temperature on dielectric properties of ice in the range 5-39 GHz. Journal of Applied Physics, 1996; 80(10), 5884-5890.

Preradovic, S. et al., Chipless RFID tag with integrated resistive and capacitive sensors. Asia-Pacific Microwave Conference Proceedings, APMC, 2011; 1354-1357.

Preradovic, S. et al., Chipless RFID Tag with integrated sensor. In Proceedings of IEEE Sensors, 2010; 1277-1281. Retrieved from https://doi.org/10.1109/ICSENS.2010.5690591.

Svacina, J. Analysis of multilayer microstrip lines by a conformal mapping method. Microwave Theory and Techniques, IEEE Transactions on, 1992; 40(4), 769-772.

Thai, T.T., et al., A novel passive ultrasensitive RF temperature transducer for remote sensing and identification utilizing radar cross sections variability. In 2010 IEEE International Symposium on Antennas and Propagation and CNC-USNC/URSI Radio Science Meeting—Leading the Wave, AP-S/URSI 2010.

Thai, T.T., et al., Design and development of novel passive wireless ultrasensitive RF temperature transducer for remote sensing. IEEE Sensors Journal, 2012; 12(9), 2756-2766.

Traille, A. et al., A wireless passive RCS-based temperature Sensor using liquid metal and microfluidics technologies. European Microwave Conference, 2011; 45-48.

Vena, A., et al., A fully printable chipless RFID tag with detuning correction technique, IEEE Microwave and Wireless Components Letters, 2012; 22(4), 209-211.

Wheeler, H.A. Transmission-Line Properties of Parallel Wide Strips by a Conformal-Mapping Approximation. IRE, 1964; 12(3), 280-289.

* cited by examiner

FIG. 4

| NaCl concentration (% by weight) | Sample on resonator | Theoretical freezing temperature |
|---|---|---|
| 0% | 5 | 0C |
| 10% | 4 | -6.4C |
| 15% | 3 | -9.6C |
| 20% | 2 | -12.8C |

CHIPLESS RFID-BASED TEMPERATURE THRESHOLD SENSOR

CROSS-REFERENCE TO RELATED APPLICATIONS

The present invention claims priority to U.S. Provisional Patent Application Ser. No. 62/435,460, filed Dec. 16, 2016, which is incorporated by reference in its entirety.

FIELD

Provided herein are chipless radio-frequency identification (RFID)-based sensors that exhibit an altered electromagnetic signature when sensor-specific temperature threshold is crossed.

BACKGROUND

Temperature sensing with chipless RFID-based sensors has been an area of intense research (Amin & Karmakar, 2011; Mahmood, Sigmarsson, Joshi, Chappell, & Peroulis, 2007; Mandel et al., 2011; Preradovic, Kamakar, & Amin, 2011; Preradovic & Karmakar, 2010; Thai et al., 2010, 2012; Traille et al., 2011; incorporated by reference in their entireties). The proposed sensors can be separated into two different groups: a first group where the tag's resonators are connected to a resistive or capacitive sensor, changing the resonator's quality factor (and therefore the RCS level) or the resonant frequency respectively. The sensors in the second group rely on materials which dielectric permittivity changes with temperature. For example, stanyl polyamide is used as a superstrate of a spiral resonator (Amin, Saha, & Karmakar, 2014; incorporated by reference in its entirety). The dielectric permittivity of this material is very sensitive to changes in temperature, therefore when temperature changes the effective dielectric permittivity seen by the resonator changes, producing a frequency shift in its resonant frequency that can be detected and used to estimate the temperature. In a different approach, but relying in the same principle, a double split ring resonator is loaded with a MEMS based capacitor (Thai et al., 2012; incorporated by reference in its entirety). The capacitor is formed with a micro-cantilever that is built using two different materials with different thermal expansion coefficients. Due to this difference in thermal expansion coefficients, temperature changes produce a bent in the cantilever, changing its series capacitance resulting in a frequency shift in the resonator that is used to estimate the temperature. Although important, there are many applications for which the absolute temperature is not as important as detecting when a certain temperature threshold is crossed. The food (especially produce) supply chain, biological storage and chemical storage are some applications where it is important to ensure that a given threshold temperature is not crossed. In these cases, a sensor that detects this violation of the threshold temperature and stores this information is desired. Although most applications in the cold supply chain are concerned with temperatures remaining below a given threshold (e.g. ice cream, which should not soften or melt in the supply chain), the invention disclosed herein is also applicable to cases in which the temperature should not be too cold; it is the change in dielectric properties of the temperature-sensitive material that gives rise to a corresponding change in radio frequency signature of the tags.

SUMMARY

Provided herein are chipless radio-frequency identification (RFID)-based sensors that exhibit an altered electromagnetic (EM) signature when sensor-specific temperature threshold is crossed. In particular, RFID-based sensors are provided that comprise a temperature sensitive material (e.g., an aqueous or organic solution) that induces an alteration in the RFID EM signature when a temperature threshold is crossed, as well as methods of using such devices to detect application-relevant temperature thresholds, for example, in fields such as produce supply chain, biological, chemical and medical storage, etc.

In some embodiments, provided herein are radio-frequency identification (RFID)-based sensors comprising a dielectric substrate material, one or more conductive resonators, and a temperature-sensitive superstrate material. In some embodiments, the temperature-sensitive superstrate material is an aqueous solution. In some embodiments, the aqueous solution comprises NaCl in $H_2O$. In some embodiments, (a) if the RFID-based sensor has not been exposed to a temperature more extreme than a threshold temperature, upon interrogation by an electromagnetic wave (EMW), the RFID-based sensor reflects a first electromagnetic signature (EMS); and (b) if the RFID-based sensor has been exposed to a temperature more extreme than a threshold temperature, upon interrogation by the EMW, the RFID-based sensor reflects a second EMS, wherein the second EMS is detectably distinct from the first EMS. In some embodiments, if the RFID-based sensor has been exposed to the temperature more extreme than a threshold temperature, upon interrogation by the EMW, the RFID-based sensor reflects the second EMS, even if the temperature returns to a less extreme temperature than the threshold temperature. In some embodiments, a more extreme temperature is above the threshold temperature.

In some embodiments, provided herein are methods of determining whether a composition has experienced a temperature more extreme than a threshold temperature, comprising tagging the composition with an RFID-based sensor described herein. In some embodiments, the composition comprises temperature-sensitive objects, goods, and/or materials.

In some embodiments, provided herein are temperature-sensitive objects, goods, and/or materials tagged with an RFID-based sensor described herein.

BRIEF DESCRIPTION OF THE DRAWINGS

FIG. 4. NaCl sample concentrations and locations.

DEFINITIONS

Figure 1:
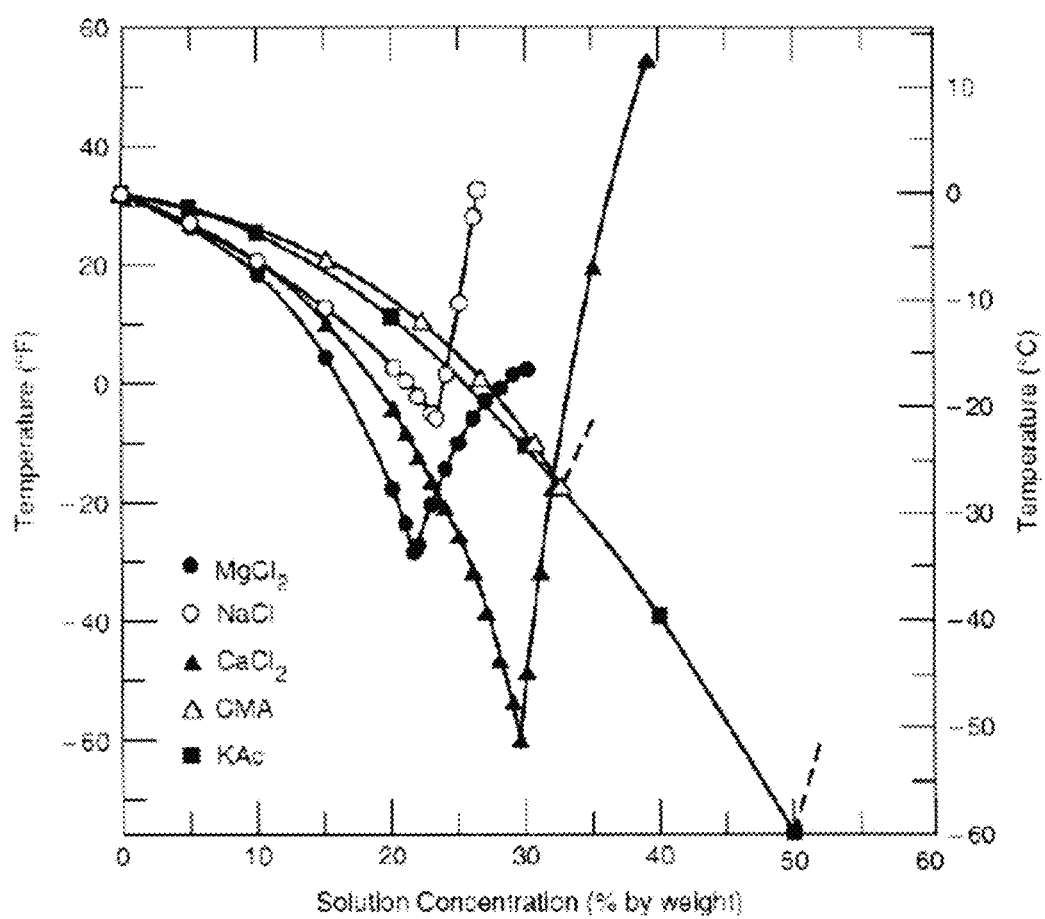
FIG. 1. Freezing point depression of ideal solution vs real solution of NaCl, MgCl2 and MgSO4 in water.
Figure 2:
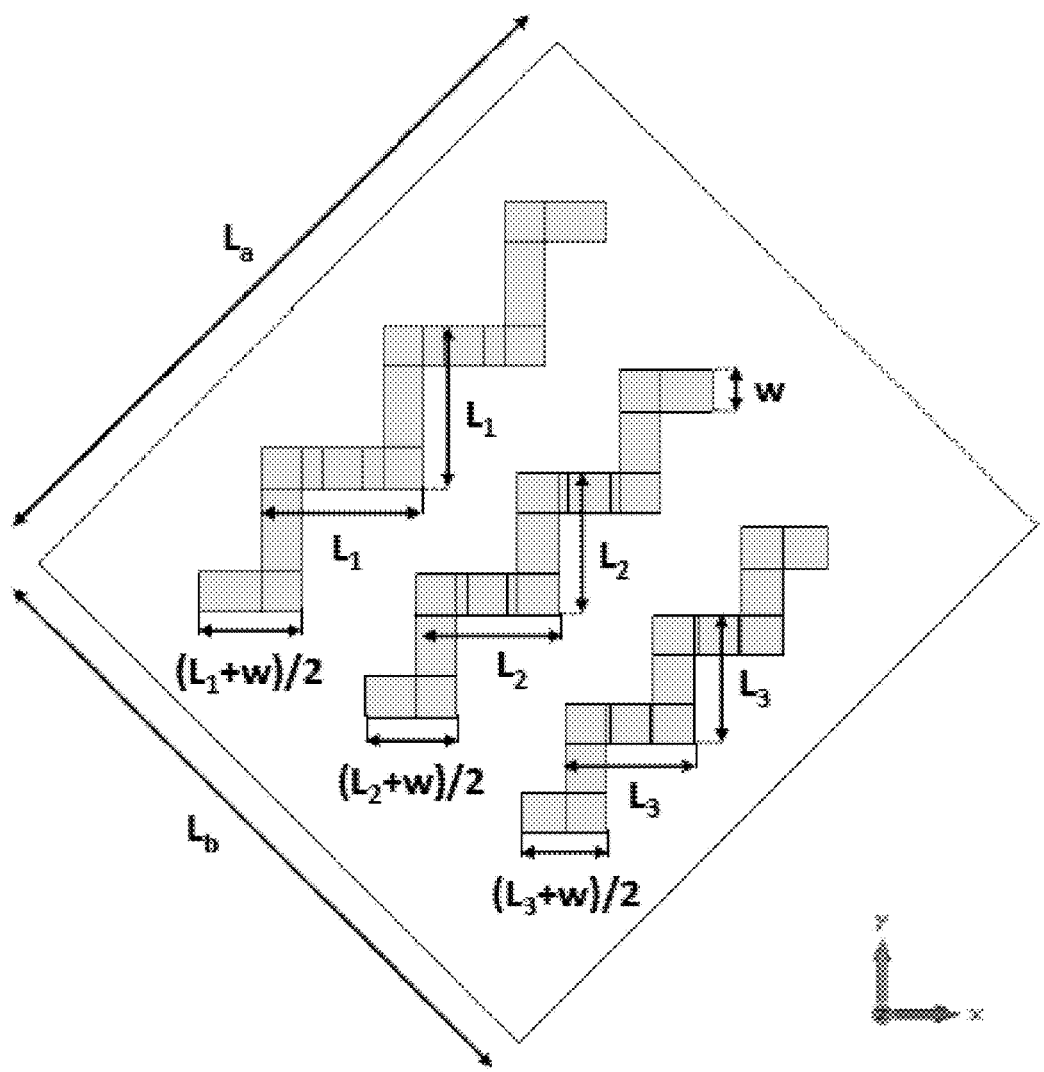
FIG. 2. Chipless RFID tag based on ladder-shape resonators.

As used herein, the term "radio frequency identification," or "RFID tag," or "RFID device," and any combination or conjugation thereof, refers to any tags or devices capable of transmitting data for identification purposes to a receiver. In particular embodiments, an RFID tag is interrogated by a radio frequency (RF) signal and responds (e.g., by passive reflection) by transmitting an identifying signal encoding data.

As used herein, the term "chip" refers to any semiconductor device or integrated circuit (e.g., those made with silicon, gallium arsenide, silicon-germanium, indium phosphide, etc.), and may include active devices and/or components selected from, but not limited to, imagers, light sensors, photo or laser diodes, capacitors, resistors, transistors, etc. As used herein, a "chipless" device is one lacking an active "chip." While the shape- and (hence) property-shifting characteristics of the present invention enable a chipless RFID response, the invention is not limited to chipless approaches, and indeed, in some embodiments, altering the electromagnetic signature of the pattern is instead (or in addition) used to alter the properties or response of an RFID tag having a chip.

As used herein, the term "passive" refers to a device (e.g., RFID tag), component, or method that does not contain and/or require electronic circuitry or electrical power.

As used herein, the term "active" refers to a device (e.g., RFID tag), component, or method that contains and/or requires electronic circuitry or electrical power.

As used herein, the term "patch," "patch antenna," or "patch tag" refers to a low profile, resonant device that can be mounted on a surface (e.g., a flat surface). Patches within the scope of the invention comprise a thin conductive material mounted on a dielectric surface. The conductive material acts as the antenna or reflective tag.

As used herein, the term "dielectric" or "dielectric material" refers to is an electrical insulator or insulating material that can be polarized by an applied electric field. When a "dielectric" is placed in an electric field, electric charges do not flow through the material as they do in a conductor. Rather, the charge is slightly shifted from the average equilibrium, causing dielectric polarization.

As used herein, the term "conductor" or "conductive material" refers to an electrical conductor of electric-conductive material, a material that readily permits the flow of electric charges there through.

DETAILED DESCRIPTION

Provided herein are chipless radio-frequency identification (RFID)-based sensors that exhibit an altered electromagnetic (EM) signature when sensor-specific temperature threshold is crossed. In particular, RFID-based sensors are provided that comprise a temperature sensitive material (e.g., an aqueous or organic solution) that induces an alteration in the RFID EM signature when a temperature threshold is crossed, as well as methods of using such devices to detect application-relevant temperature thresholds, for example, in fields such as produce supply chain, biological, chemical or medical storage, etc.

Dissolving a solute into a solvent decreases its freezing point following a depression curve, the so called Blagden's Law:

$$\Delta T = K_f \cdot b \cdot i$$

Where $\Delta T$ is the frequency shift in the freezing point of the solution in degrees Kelvin, Kf is the cryoscopic constant of the solvent (for water Kf=1.853 K Kg/mol), b is the molarity of the solution, and i is the Van't Hoff factor, which is the number of ions in solution for each dissolved molecule (e.g., for NaCl, i=2). The freezing point depression can be modeled by Blagden's Law, provided that the solution is treated as ideal. This means that for lower solute concentrations, the results are accurate while they vary for concentrations approaching the saturation point of the solution (see Figure).

A model of the freezing point of water with different NaCl concentrations (Masoudi, Arjmandi, & Tohidi, 2003; incorporated by reference in its entirety) has been compared to experimental results (Lide, 2013; incorporated by reference in its entirety). The results give freezing point values ranging from 0° C. for pure water to −21° C. for water saturated with NaCl (the eutectic temperature of the NaCl-water solution). Therefore, by controlling the proportion of NaCl in the solution a sensor with any threshold temperature between 0 and −21° C. is achievable.

In some embodiments, sensors described herein are based on depolarizing tag formed by microstrip resonators following a staircase pattern (Figure) (Martinez & van der Weide, 2016; incorporated by reference in its entirety). In some embodiments, the temperature sensitive material is used as a superstrate this tag design, guaranteeing that the host substrate (e.g., where the tag is placed) does not affect the response of the tag or interfere with the sensing measurement. In addition, the depolarizing effect on the backscatter increases the signal to noise and interference ratio improving the reliability of the sensor.

The resonant frequency of a microstrip dipole is estimated using:

$$f_{res} = \frac{c_0}{2 \cdot (L + 2 \cdot DL) \cdot \sqrt{\epsilon_{eff}}}$$

Where L is the length of the dipole, DL accounts for the extension in electrical length of the dipole due to fringing effects at both ends of the dipole and $\varepsilon_{eff}$ is the effective dielectric permittivity seen by the dipole. The extension in electrical length due to fringing effects can be approximated by:

$$DL = h1 \cdot 0.412 \cdot (\epsilon_{eff} + 0.3) \cdot \left(\frac{w}{h1} + 0.264\right) / \left((\epsilon_{eff} - 0.258) \cdot \left(\frac{w}{h1} + 0.8\right)\right)$$

(Balanis, 2005; incorporated by reference in its entirety) To estimate the effective dielectric permittivity seen by the microstrip line, the static value approximation, that assumes the transmission line as TEM is used (the electric and magnetic field components are transversal to the propagation direction of the EM wave along the transmission line) (Bahl & Garg, 1977; incorporated by reference in its entirety):

For $W/h \leq 1$, $$\epsilon_{eff} = \frac{\epsilon_r + 1}{2} + \frac{\epsilon_r - 1}{2} \cdot \left[\sqrt{1 + 12\frac{h}{W}} + 0.04\left(1 - \frac{W}{h}\right)^2\right]$$

For $W/h \geq 1$, $$\epsilon_{eff} = \frac{\epsilon_r + 1}{2} + \frac{\epsilon_r - 1}{2} \cdot \sqrt{1 + 12 \cdot \frac{h}{W}}$$

In some embodiments, when a superstrate is added to the tag, the effective dielectric permittivity seen by the resonators changes, producing a frequency shift that is proportional to this change. Ice has a dielectric permittivity between 3.1 and 3.2 (Fujita, Matsuoka, Ishida, Matsuoka, & Mae, 2000; Matsuoka, Fujita, & Mae, 1996; incorporated by reference in their entireties). A model for a 2 substrate microstrip line with one substrate and one superstrate is used to estimate the frequency shift produced by the ice superstrate layer (Svacina, 1992; incorporated by reference in its entirety). This model has been obtained using conformal mapping methods and Wheeler's transformation (Wheeler, 1964; incorporated by reference in its entirety).

$$\epsilon_{eff} = \epsilon_{r1} q_1 + \epsilon_{r2} \cdot \frac{(1-q_1)^2}{\epsilon_{r2}(1-q_1-q_2)+q_2}$$

Where $\epsilon r1$ is the dielectric permittivity of the substrate, $\epsilon r2$ the dielectric permittivity of the superstrate and q1 and q2 are the filling factors and depend on the substrate thicknesses and line width:
For $W/h \geq 1$, $$q_1 = 1 - \frac{1}{2} \cdot \frac{\ln\left(\frac{\pi}{h} w_{ef} - 1\right)}{\frac{w_{ef}}{h}} \quad q_2 = 1 - q_1 - \frac{1}{2} \cdot \frac{h - v_e}{w_{ef}}$$

where the effective line width is:

$$w_{ef} = w + \frac{2h}{\pi} \ln\left[17.08\left(\frac{w}{2h} + 0.92\right)\right]$$

and the parameter $v_e$:

$$v_e = 2\frac{h}{\pi} \arctan\left[\frac{\pi}{\frac{\pi}{2}\frac{w_{ef}}{h} - 2}\left(\frac{h_2}{h} - 1\right)\right]$$

For $W/h \leq 1$, $$q_1 = \frac{1}{2} + \frac{0.9}{\pi \cdot \ln\frac{h}{w}}$$

$$q_2 = \frac{1}{2} - \frac{a\cos\left[\left[1 - \frac{h}{h_2}\left(1 - \frac{w}{8h}\right)\right]\sqrt{\frac{h_2/h+1}{h_2/h+w/4h-1}}\right]}{\pi \cdot \ln\frac{8h}{w}}$$

Experiments conducted during development of embodiments herein demonstrate the use of aqueous solutions (e.g., NaCl-water solutions) as the temperature sensitive material to build a threshold temperature sensor. In some embodiments, sensors detect the event of temperature surpassing a given value. In some embodiments, sensors retain the threshold-surpassing information, even when the temperature goes back to initial values below the threshold. An exemplary device is presented and the results demonstrate sensors with threshold temperatures between 0° C. and −20° C. (e.g., 0° C., −1° C., −2° C., −3° C., −4° C., −5° C., −6° C., −7° C., −8° C., −9° C., −10° C., −11° C., −12° C., −13° C., −14° C., −15° C., −16° C., −17° C., −18° C., −19° C., −20° C., or ranges therebetween). Other threshold temperatures (e.g., >0° C. (e.g., 1° C., 2° C., 3° C., 4° C., 5° C., 6° C., 7° C., 8° C., 9° C., 10° C., or greater, or ranges therebetween) <−20° C. (e.g., −21° C., −22° C., −23° C., −24° C., −25° C., −26° C., −27° C., −28° C., −29° C., −30° C., or lower, or ranges therebetween) are achievable using other solvents (e.g., EtOH, MeOH, acetic acid, acetone, THF, dioxane, benzene, etc.), solutes (e.g., KCl, $MgCl_2$, $NH_4Cl$, $CaCO_3$, etc.), concentrations (e.g., 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, or more, or ranges therebetween), etc. It has been validated that sensors with multiple threshold temperatures are achievable.

In some embodiments, a background subtraction approach is provided to detect tag response changes in dynamic environments. Unlike previous calibration methods that rely on the measurement of the background in the absence of the tag, methods herein work without this information. In some embodiments, the validation setup relies on the change in sensor's response along time to detect the crossing of the temperature thresholds. In some embodiments, in applications where the temperature is constant at the time of measurement, other methods are used to read the state of the sensor.

In some embodiments, the devices herein comprise a conductive patch mounted upon a dielectric material. In some embodiments, the conductive patch comprises one or more resonators embedded therein. The resonators may be cut into the conductive material or created upon production (e.g., printing) of the patch. In some embodiments, upon interrogation of the tag by an electromagnetic wave (EMW), each resonator results in the reflection of electromagnetic energy at a specific frequency producing an electromagnetic signature (EMS) of the device. In some embodiments, based on the particular length(s) and/or shapes of the resonator(s), the tag will reflect an identifiable EMS. In some embodiments, the EMS is dependent upon the shape and/or orientation of the conductive material and/or resonators on the dielectric material.

Any suitable shape or type of resonators described herein or understood in the field will find use with embodiments herein (e.g., slot resonators (See, e.g., U.S. Ser. No. 14/593,833; incorporated by reference in its entirety), microstrip resonators, etc.). Any suitable patch material and/or dielectric material will find use in embodiments herein.

In some embodiments, an RFID tag comprises a patch of any suitable material (e.g., conductive material) for reflecting an electromagnetic signal (e.g., radio signal (e.g., UWB signal)). In some embodiments, a patch is a conductive material. Exemplary materials include metals (e.g., copper, gold, silver, titanium, etc.), alloys (brass, stainless steel, etc.), composites (e.g., woven fiberglass cloth with an epoxy resin binder (e.g., FR-4)), plastics, etc. Those of skill in the art of antenna design/manufacture will understand the types of conductive materials suitable for patch manufacture.

In some embodiments, an RFID tag comprises a substrate (e.g., upon which a conductive patch is placed e.g., printed, adhered to, etc.). In some embodiments, a substrate is any suitable dielectric material. Exemplary dielectric materials include polymer, such as Teflon, polypropylene or polyethylene, materials like epoxy or polyimide, of dielectric alloys, such as alumina or magnesium titanate or barium titanate. The substrate can also be a flexible foam. Those of skill in the art of antenna design/manufacture will understand the types of dielectric materials suitable for substrate manufacture.

In some embodiments, RFID tags and the specific components thereof (e.g., patch, substrate, etc.) comprise one or more metals, alloys, plastics, polymers, natural materials, synthetic materials, fabrics, etc. In some embodiments, components comprise one or more metals including but not limited to aluminum, antimony, boron, cadmium, cesium, chromium, cobalt, copper, gold, iron, lead, lithium, manganese, mercury, molybdenum, nickel, platinum, palladium, rhodium, silver, tin, titanium, tungsten, vanadium, and zinc. In some embodiments, components comprise one or more alloys including but not limited to alloys of aluminum (e.g., Al—Li, alumel, duralumin, magnox, zamak, etc.), alloys of iron (e.g., steel, stainless steel, surgical stainless steel, silicon steel, tool steel, cast iron, Spiegeleisen, etc.), alloys of cobalt (e.g., stellite, talonite, etc.), alloys of nickel (e.g., German silver, chromel, mu-metal, monel metal, nichrome, nicrosil, nisil, nitinol, etc.), alloys of copper (beryllium copper, billon, brass, bronze, phosphor bronze, constantan, cupronickel, bell metal, Devarda's alloy, gilding metal, nickel silver, nordic gold, prince's metal, tumbaga, etc.), alloys of silver (e.g., sterling silver, etc.), alloys of tin (e.g., Britannium, pewter, solder, etc.), alloys of gold (electrum, white gold, etc.), amalgam, and alloys of lead (e.g., solder, terne, type meta, etc.). In some embodiments, components comprise one or more plastics including but not limited to Bakelite, neoprene, nylon, PVC, polystyrene, polyacrylonitrile, PVB, silicone, rubber, polyamide, synthetic rubber, vulcanized rubber, acrylic, polyethylene, polypropylene, polyethylene terephthalate, polytetrafluoroethylene, Gore-Tex, polycarbonate, etc. In some embodiments, components comprise glass, textiles (e.g., from animal, plant, mineral, and/or synthetic sources), liquids, etc. In some embodiments, components comprise TEFLON, HDPE, nylon, PEEK, PTFE, PEBAX, or other suitable materials.

In some embodiments, devices herein comprise a superstrate. In some embodiments, the superstrate is a temperature sensitive material. In some embodiments, the superstrate comprises one or more solutes dissolved in a solvent. In some embodiments, the identity of the superstrate solution determines the threshold temperature of the device. In some embodiments, the solvent is water. In other embodiments, the solvent is an organic solvent, such as EtOH, MeOH, acetic acid, toluene, benzene, etc. In some embodiments, the solute is a salt of common cations (e.g., ammonium ($NH^+_4$), calcium ($Ca^{2+}$), iron ($Fe^{2+}$, $Fe^{3+}$), magnesium ($Mg^{2+}$), potassium ($K^+$), sodium ($Na^+$), etc.) and anions (e.g., acetate $CH_3COO^-$, carbonate $CO2^{-3}$, chloride $Cl^-$, citrate $HOC(COO^-)(CH_2COO^-)_2$, fluoride $F^-$, nitrate $NO^-_3$, nitrite $NO^-_2$, oxide $O_2^-$, phosphate $PO_3^{-4}$, sulfate $SO_2^{-4}$, etc.).

In some embodiments, devices herein are coated with a protective material (e.g., polymer film).

EXPERIMENTAL

Figure 3:
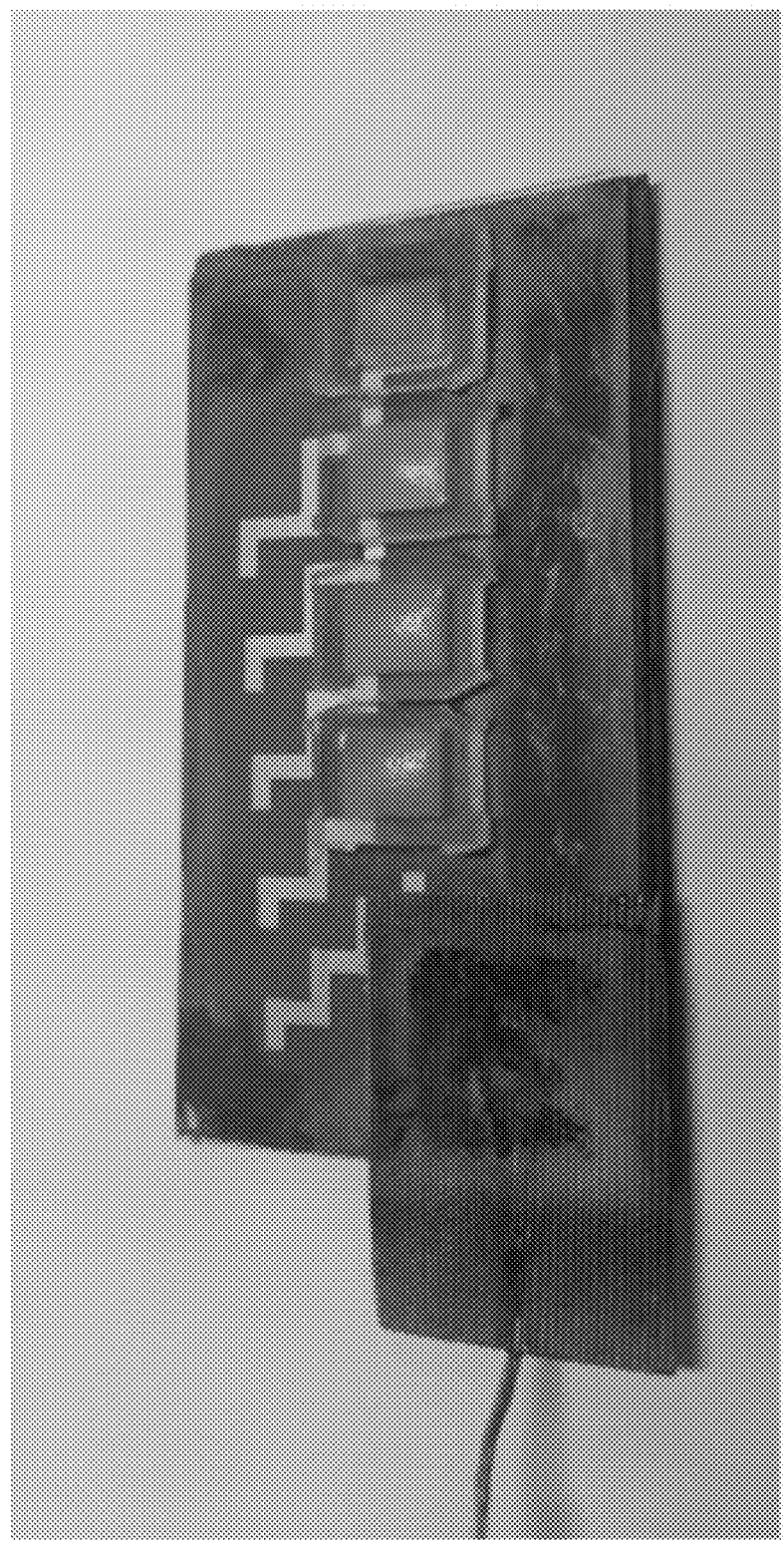
FIG. 3. Fabricated chipless RFID-based temperature threshold sensor.

Experiments conducted during development of embodiments herein using a tag comprising 5 ladder-shaped resonators fabricated on a Taconic TLX-9 substrate (thickness h=2.02 mm), with resonator widths w=1.5 mm and resonator lengths: L_1=4.5 mm, L_2=5 mm, L_3=5.5 mm, L_4=5.8 mm, and L_5=6.2 mm (See FIG. 3; length is considered as depicted in Figure). The tag was covered with a hydrophobic hardcoated polyester film (Tekra corporation). This film ensures that the ice sample is removed from the top of the tag when it melts. 4 80 uL water samples with different NaCl concentrations are placed on top of the 4 largest resonators (concentration and locations are specified in FIG. 4). In addition, a temperature sensor is placed on top of the sensor to monitor the temperature along time.

Figure 5:
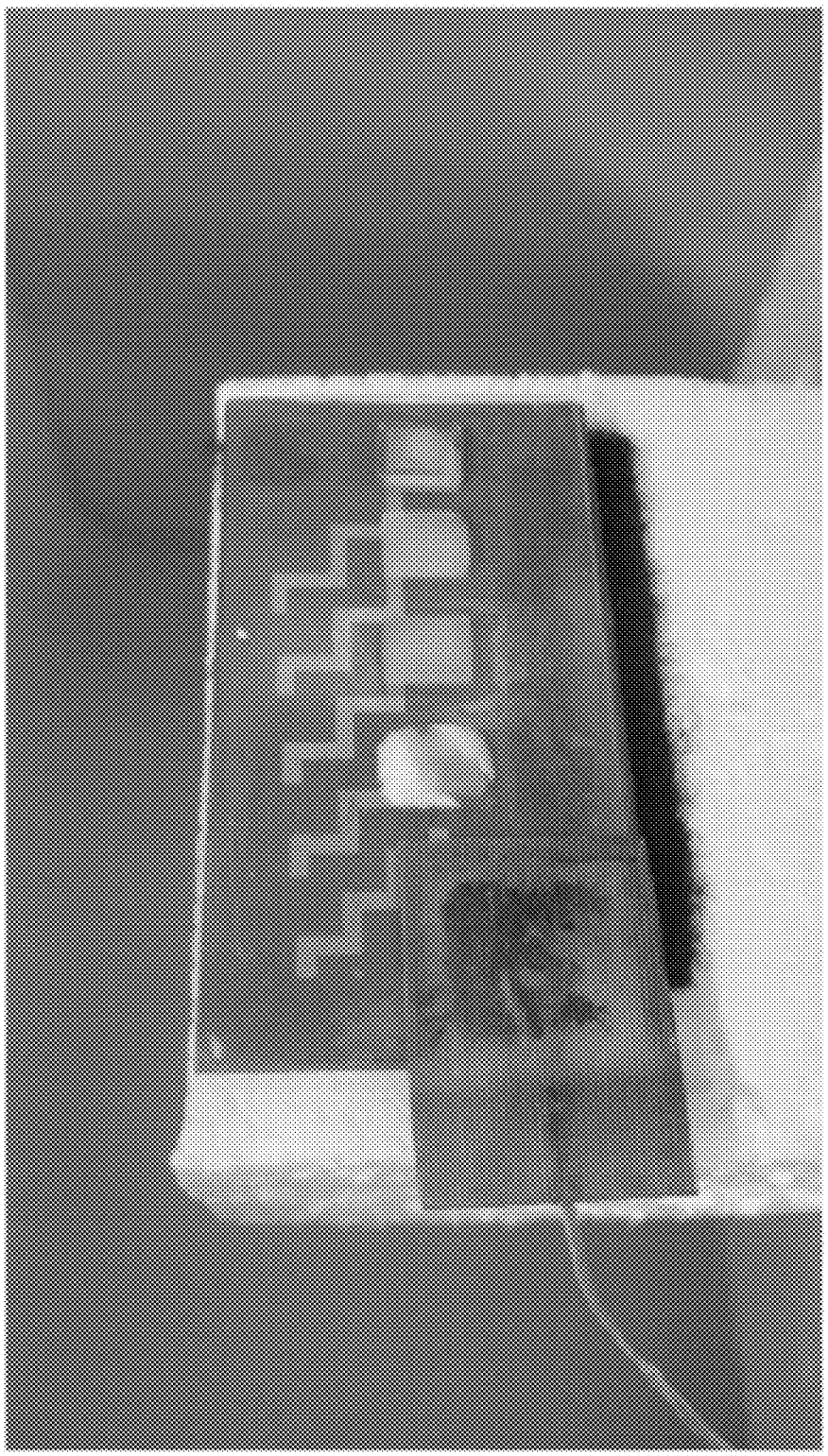
FIG. 5. Fabricated chipless RFID-based temperature threshold sensor inside freezer.

The sensor was placed inside a freezer set to −30 degree Celsius. The gaskets used to keep the samples on top of the resonators were removed once the samples were frozen (FIG. 5). The freezer door is replaced with a Styrofoam layer that ensures temperature isolation while allows the EM signal from the reader to reach the sensor.

To read the sensor an Agilent N5230A Vector Network Analyzer connected to an ETS-Lindgren 3164-04 dual polarized horn antenna are used. The VNA is controlled via GPM from a computer and it is configured to measure the S21 parameter from 2 to 6 GHz with an output power of 10 dBm.

Figure 6:
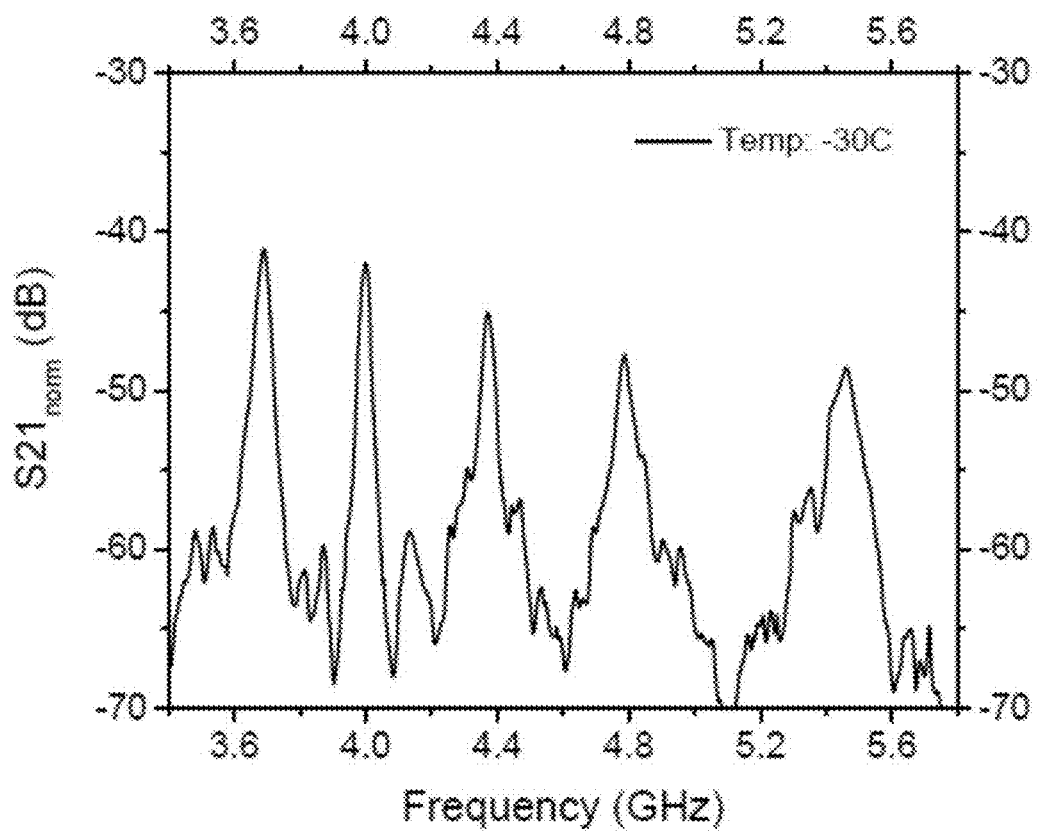
FIG. 6. Frequency response of sensor at −30 degree Celsius. The resonant frequency of resonators 2 to 5 are shifted due to the presence of the ice samples.
Figure 7:
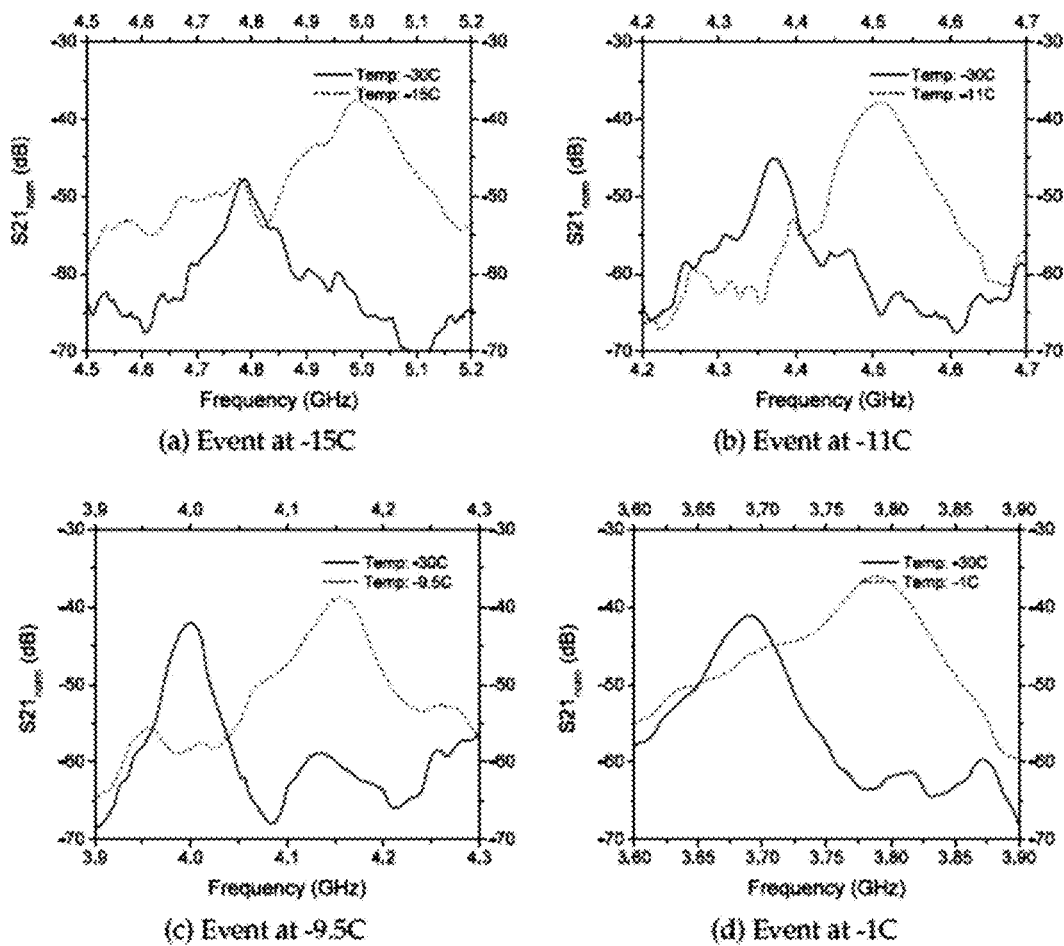
FIG. 7. Frequency shift events of the temperature sensor.

Due to the highly reflective characteristics of the measuring volume and its variability during the measuring time it is not possible to perform a calibration as described in (Vena, Perret, & Tedjini, 2012). For that reason a new approach to the frequency domain measurement of chipless RFID tags is proposed. To characterize the sensor a temperature ramp from −30° C. to 0° C. is performed in the freezer. The temperature ramp takes 80 minutes approximately and the reader is set to capture a S21 trace every 10 seconds. Since it is a dynamic phenomenon (the change in resonant frequency when the melting point of each sample of ice is reached) a calibration of each measurement was performed with respect to a measurement taken previously, more concretely $\Delta t$ seconds before. For this "sliding" calibration to work the time distance between the current measurement (to be calibrated) and the previous measurement (used as the calibration measurement) has to be chosen carefully. If the time is too large the changes in the background can "hide" the event. If the time is too short, the change between measurements can be so small that is not detectable. Different values are tried between 10 seconds (the time between two consecutive measurements) and 200 seconds (20 measurements distance between the current measurement and the measurement we use for calibration). Best results are obtained for $\Delta t$=150 seconds. In FIG. 6 the resonance frequency of the 5 resonators in the sensor at −30° C. are shown. As the temperature increases 4 different events are registered, each one corresponding to the melting of each NaCl-water sample. These events happen at T1=−15C, T2=−11C, T3=−9.5C and T4=−1C. The frequency shifts detected are shown in FIG. 7a) to d).

The melting temperatures at which the resonators show a shift in frequency are lower than the theoretical values calculated with Blagden's Law. The equation is only valid for very dilute solutions. As the concentration of NaCl approaches the saturation point the freezing temperature deviates to lower values, what is in line with the results shown.

REFERENCES

The following references, some of which are cited above, are herein incorporated by reference in their entireties.

Amin, E. M., & Karmakar, N. (2011). Development of a chipless RFID temperature sensor using cascaded spiral resonators. 2011 IEEE SENSORS Proceedings, 554-557.

Amin, E. M., Saha, J. K., & Karmakar, N. C. (2014). Smart sensing materials for low-cost chipless RFID sensor. IEEE Sensors Journal, 14(7), 2198-2207.

Bahl, I. J., & Garg, R. (1977). Simple and Accurate Formulas for a Microstrip with Finite Strip Thickness. Proceedings of the IEEE, 65(11), 1611-1612.

Balanis, C. E. (2005). Antenna Theory: Analysis and Design, 3rd Edition—Constantine A. Balanis. Book. Fujita, S., Matsuoka, T., Ishida, T., Matsuoka, K., & Mae, S. (2000). A summary of the complex dielectric permittivity of ice in the megahertz range and its applications for radar sounding of polar ice sheets. Physics of Ice Core Records, 185-212.

Lide, D. R. (2013). CRC Handbook of Chemistry and Physics, 94th Edition, 2013-2014. Handbook of Chemistry and Physics (Vol. 53).

Mahmood, A., Sigmarsson, H. H., Joshi, H., Chappell, W. J., & Peroulis, D. (2007). An evanescent-mode cavity resonator based thermal sensor. Proceedings of IEEE Sensors, 950-953.

Mandel, C., Maune, H., Maasch, M., Sazegar, M., Kubina, B., SchÜβler, M., & Jakoby, R. (2011). Wireless temperature sensing with bst-based chipless transponder utilizing a passive phase modulation scheme. In Frequenz (Vol. 65, pp. 225-231).

Martinez, M., & Van Der Weide, D. (2016). Circular polarization on depolarizing chipless RFID tags. IEEE Radio and Wireless Symposium, RWS, 2016-March, 145-147.

Masoudi, R., Arjmandi, M., & Tohidi, B. (2003). Extension of Valderrama-Patel-Teja equation of state to modelling single and mixed electrolyte solutions. Chemical Engineering Science, 58(9), 1743-1749.

Matsuoka, T., Fujita, S., & Mae, S. (1996). Effect of temperature on dielectric properties of ice in the range 5-39 GHz. Journal of Applied Physics, 80(10), 5884-5890.

Preradovic, S., Kamakar, N., & Amin, E. M. (2011). Chipless RFID tag with integrated resistive and capacitive sensors. Asia-Pacific Microwave Conference Proceedings, APMC, 1354-1357. Retrieved from Preradovic, S., & Karmakar, N. (2010). Chipless RFID tag with integrated sensor. In Proceedings of IEEE Sensors (pp. 1277-1281). https://doi.org/10.1109/ICSENS.2010.5690591

Svacina, J. (1992). Analysis of multilayer microstrip lines by a conformal mapping method. Microwave Theory and Techniques, IEEE Transactions on, 40(4), 769-772.

Thai, T. T., Chebila, F., Mehdi, J. M., Pons, P., Aubert, H., Dejean, G. R., . . . Plana, R. (2010). A novel passive ultrasensitive RF temperature transducer for remote sensing and identification utilizing radar cross sections variability. In 2010 IEEE International Symposium on Antennas and Propagation and CNC-USNC/URSI Radio Science Meeting—Leading the Wave, AP-S/URSI 2010.

Thai, T. T., Mehdi, J. M., Chebila, F., Aubert, H., Pons, P., Dejean, G. R., . . . Plana, R. (2012). Design and development of a novel passive wireless ultrasensitive RF temperature transducer for remote sensing. IEEE Sensors Journal, 12(9), 2756-2766.

Traille, A., Bouaziz, S., Pinon, S., Pons, P., Aubert, H., & Boukabache, A. (2011). A Wireless Passive RCS-based Temperature Sensor using Liquid Metal and Microfluidics Technologies. European Microwave Conference, (October), 45-48.

Vena, A., Perret, E., & Tedjini, S. (2012). A fully printable Chipless RFID tag with detuning correction technique. IEEE Microwave and Wireless Components Letters, 22(4), 209-211.

Wheeler, H. a. (1964). Transmission-Line Properties of Parallel Wide Strips by a Conformal-Mapping Approximation. IRE Transactions on Microwave Theory and Techniques, 12(3), 280-289.

The invention claimed is:

1. A chipless radio-frequency identification (RFID)-based sensor comprising a dielectric substrate material, one or more conductive resonators, and a temperature-sensitive superstrate material having a defined melting temperature; wherein:
    (a) if the RFID-based sensor is maintained at a temperature below the melting temperature of the temperature-sensitive superstrate material, then upon interrogation by an electromagnetic wave (EMW), the RFID-based sensor reflects a first electromagnetic signature (EMS); and
    (b) if the RFID-based sensor is exposed to a temperature above the melting temperature of the temperature-sensitive superstrate material, then upon interrogation by the EMW, the RFID-based sensor reflects a distinguishable EMS, wherein the distinguishable EMS is detectably distinct from the first EMS;
    wherein, if the RFID-based sensor has been exposed to the temperature above the melting temperature of the temperature-sensitive superstrate material, then the RFID-based sensor will not reflect the first EMS upon interrogation by the EMW even if the temperature at the time of interrogation has returned to a temperature below the melting temperature of the temperature-sensitive superstrate material.

2. The RFID-based sensor of claim 1, wherein the temperature-sensitive superstrate material comprises an aqueous solution.

3. The RFID-based sensor of claim 2, wherein the aqueous solution comprises sodium chloride (NaCl) in water ($H_2O$).

4. The RFID-based sensor of claim 1, wherein the conductive resonator is a slot resonator.

5. The RFID-based sensor of claim 1, wherein the conductive resonator is a microstrip resonator.

6. The RFID-based sensor of claim 5, wherein the microstrip resonator is in a staircase pattern.

7. The RFID-based sensor of claim 1, wherein the temperature-sensitive superstrate material comprises an organic solvent.

8. The RFID-based sensor of claim 1, wherein the organic solvent is selected from the group consisting of ethanol (EtOH), methanol (MEOH), acetic acid, tetrahydrofuran (THF), acetone, dioxane, and benzene.

9. The RFID-based sensor of claim 1, wherein the melting temperature is between 0° C. and −20° C.

10. The RFID-based sensor of claim 1, wherein the melting temperature is between 1° C. and 10° C.

11. The RFID-based sensor of claim 1, wherein the dielectric substrate material, the one or more conductive resonators, and the temperature-sensitive superstrate material are contained within a protective polymer material.

* * * * *